United States Patent [19]
Fix et al.

[11] Patent Number: 5,430,771
[45] Date of Patent: Jul. 4, 1995

[54] METHOD OF AND APPARATUS FOR DETECTING THE PRESENCE OF DATA IN A RECEIVED SIGNAL BY MONITORING THE SPREAD OF VALUES TO SYNCHRONIZE RECEIVER

[75] Inventors: Keith A. Fix; Douglas M. Merz, both of Cincinnati; Terrance J. Hill, Fairfield, all of Ohio

[73] Assignee: Cincinnati Electronics Corporation, Mason, Ohio

[21] Appl. No.: 850,366

[22] Filed: Mar. 12, 1992

[51] Int. Cl.[6] .............................................. H04L 7/00
[52] U.S. Cl. .............................................. 375/354
[58] Field of Search ............... 375/106, 110, 114, 116, 375/118, 119, 120, 94, 80, 81; 328/133, 155, 63, 72, 75, 151; 331/18, 25; 307/511, 518, 523, 358, 359, 362, 269

[56] References Cited
U.S. PATENT DOCUMENTS 4,414,676  11/1983  Kraul et al. ...................... 375/116
5,073,905  12/1991  Dapper et al. ..................... 375/106

Primary Examiner—Stephen Chin
Assistant Examiner—Hai H. Phan
Attorney, Agent, or Firm—Lowe, Price, LeBlanc & Becker

[57] ABSTRACT

A receiver is synchronized to a signal and the presence of data in the signal is detected by responding to the signal to derive indications of the amount of time shift necessary to achieve synchronization between the receiver and signal. The receiver is adjusted to be in synchronization with the signal in response to the time shift indications. A measure of the spread of values of the time shift indications is derived. The presence of data in the signal is flagged in response to the spread of values being less than a threshold value.

28 Claims, 2 Drawing Sheets

METHOD OF AND APPARATUS FOR DETECTING THE PRESENCE OF DATA IN A RECEIVED SIGNAL BY MONITORING THE SPREAD OF VALUES TO SYNCHRONIZE RECEIVER

RELATION TO CO-PENDING APPLICATION

The invention disclosed herein is an improvement on the invention disclosed in the co-pending, commonly assigned application Ser. No. 07/396,876, filed Aug. 22, 1989, now U.S. Pat. No. 5,073,905.

FIELD OF THE INVENTION

The present invention relates generally to synchronizing receivers to received signals and for detecting the presence of data in the received signal and, more particularly, to a method of and apparatus for detecting the presence of data in a received signal by monitoring the spread of values necessary to adjust the receiver to be in synchronism with the received data.

BACKGROUND Art

In the aforementioned patent, an output of a local oscillator of a receiver is synchronized to received bits of a digital bit stream by sampling the binary value of each of the received bits several times during each of the received bits to derive for each received bit a several bit binary word representing the sampled values. These operations are performed by supplying a baseband output of the receiver to a hard limiter, which in turn drives a data input of a shift register, having a shift input responsive to a variable frequency output of a counter responsive to a crystal oscillator. An addressable memory is addressed in response to the several bit binary word. The memory derives a control signal having a value determined by estimates of the noise of each received bit of the digital bit stream and the relative phase difference between the digital bit stream and the local oscillator, as indicated by the number and positions of binary bit transitions in the several bit binary word of the shift register output. The control signal derived by the addressable memory is supplied to an averaging, i.e., low pass filter, that is enabled in synchronism with each derivation of a control signal by the addressable memory. The output of the averaging filter is continuously supplied to a controller for the counter. It has been found that this continuous control of the counter has a tendency to cause time base jitter of the sampling operation. Jitter has been found to occur even though there is substantial low pass filtering of the control signal supplied by the addressable memory to the counter, which controls the data bit sampling frequency.

In the preferred embodiment of the aforementioned patent, the addressable memory derives, from each addressed output thereof, an eight bit signal. Three of the bits control the effective rate at which data are shifted to and in the shift register and therefore the sampling rate of data bits supplied to the receiver, i.e., the local oscillator frequency. One of the memory output bits indicates the binary value of the data bit which caused the memory to be addressed. Two of the bits indicate the quality of the data bit, while one of the bits indicates if the bit should be erased. One bit at each address also indicates whether the receiver appears to be in synchronism with the received data bit stream.

The output bits at each address of the memory are pre-programmed as a function of the various combinations of samples supplied as address inputs to the memory by the shift register. Estimates of the amount of noise in a received data bit are based on the number of transitions in the sampled values supplied by the shift register to the memory address input. The noise estimate controls the values of the quality, eraser and sync indicator bits, as well as the amount of correction to be applied to the sampling frequency. The factors stored in memory that are a function of the noise estimate are pre-programmed as a function of the number of transitions in the sampled bits for each data bit. For example, if there are eight samples for each data bit and there are zero, one or two transitions in the binary values of the eight bits, the data bit which caused derivation of the samples is considered to have a relatively low noise value, with corresponding values for the quality, eraser and sync indicator bits derived from the address of the memory which was read out in response to the sampled bits. The values of the three bits controlling the data bit sampling rate by the shift register are also a function of the number of transitions of each address of the memory.

A problem with the prior art is that manufacturing tolerances cause different receivers to have a tendency to derive bi-level outputs having slightly different voltage values. For example, if the input to a hard limiter that supplies data pulses to the shift register is nominally between 0 and +5 volts, the input voltage to the hard limiter generally differs from receiver to receiver, by $\pm 0.1$ volt from the 5 volt level. In the presence of noise, this variation has a tendency to offset the bi-level signal supplied by the hard limiter to the shift register. In consequence, the sampled values derived by the shift register and supplied as address inputs to the memory have a tendency to be biased in a particular receiver. This bias tendency has a particularly adverse impact on the ability of the prior art receivers to accurately detect whether data are present in the signal received by the receiver.

It is, accordingly, an object of the present invention to provide a new and improved receiver for controlling synchronization between the receiver and a received signal, wherein synchronization is achieved in the presence of relatively high noise levels.

Another object of the invention is to provide a new and improved apparatus for and method of synchronizing a receiver to a signal wherein synchronization between the receiver and the signal are provided, as well as an accurate indication of data being present in the received signal.

Another object of the present invention is to provide a new and improved data bit receiver wherein relatively small variations in output signal levels of different receivers do not adversely affect the ability of the receivers to accurately indicate the presence of data in the received signal.

THE INVENTION

In accordance with one aspect of the invention, a receiver is synchronized to a signal and an indication of the presence of data in the signal is derived by responding to the signal to derive indications of the amount of time shift necessary to achieve synchronization between the receiver and signal. The receiver is adjusted to provide synchronization between the receiver and signal in response to the time shift indications. A measure of the spread of values of the time shift indications is derived.

A data flag is derived in response to the spread of values being less than a threshold value. The spread of values is approximately an indication of the variance, i.e., standard deviation squared, of the time shift indications. To minimize jitter in deriving the flag, the threshold is subject to change and includes hysteresis so that in response to data being flagged the threshold value is greater than when data are not flagged.

In accordance with a further aspect of the invention, a receiver is synchronized to a digital bit stream subject to noise and the presence of data in the bit stream is detected by sampling each bit of the bit stream at least several times. A memory is addressed by the samples from each bit of the bit stream. The memory is programmed to derive plural output bits having values indicative of the amount of correction to be applied to the sampled bits to provide synchronization as a function of the value of the samples addressing the memory. The rate at which bits in the digital bit stream are sampled is controlled to provide synchronization in response to output bits of the memory indicative of the amount of correction to be applied to the sampled bits. A determination is made of the spread of values of the timing correction to be applied to the sampled bits to provide synchronization. The presence of data in the bit stream is flagged in response to the spread of values being less than a threshold value.

Because the presence of data is detected by determining the spread of values of the correction signal over a prolonged time interval, i.e., over many received bits, greater accuracy is attained with the present invention than is achieved with the prior art, wherein data detection is dependent on the noise content of a particular received bit, as reflected in the number of transitions in the bit. The greater accuracy is achieved because of the inherent stability associated with accumulating the correction signals over a prolonged interval. In addition, determining the spread of values of the correction signal over a prolonged time interval reduces the tendency for data detection errors due to slight deviations in the bi-level outputs of different receivers which result from manufacturing tolerances, as discussed supra.

In the preferred embodiment, the control signal has a value determined by estimates of the noise of each received bit and the relative phase difference between the received digital bit stream and the local oscillator which is used for synchronization. The noise estimates are indicated by the number and positions of binary bit transitions in the samples derived for each received bit. In consequence, the spread of values used for determining if data are present in the received bit stream is indicative of the noise estimates. Thereby, greater accuracies in control of the local oscillator and derivation of an indication of data being present in the received bit stream are provided.

Another feature of the invention is that the spread of values is determined merely by accumulating certain bits from the memory; the accumulated bits indicate the deviation of the correction value from a nominal value thereof. By programming the memory in this manner and performing a simple accumulation operation, an indication of variance, i.e., standard deviation squared, of the corrections is obtained without complex, cumbersome and time-consuming calculations.

To provide an accurate indication of whether data are present or not present in the received signal, the indication of the spread of values of the correction signal is calculated without considering the correction values associated with the received bits having relatively large noise content. In the preferred embodiment, where eight samples are taken of each received bit, received bits having more than three transitions in the sampled binary values are not considered in determining the spread of values used to detect whether or not data are present in the received signal. Elimination of the noisiest received bits from the calculation used to determine the spread of values provides greater accuracy for the data detect determination.

According to another aspect of the present invention, an output of a local oscillator is synchronized to received bits of a digital bit stream and the presence of data in the bit stream is determined by sampling the binary value of each of the received bits several predetermined times during each of the received bits to derive for each received bit a several-bit binary word representing the sampled values. An addressable memory is addressed in response to the several-bit binary word to derive a control signal having a value determined by estimates of the noise of each received bit of the digital bit stream and the relative phase difference between the digital bit stream and the local oscillator as indicated by the number and positions of binary bit transitions in the several-bit binary word of a digital bit stream. In response to the value of the control signal local oscillator synchronization is controlled. The synchronized local oscillator is connected to the means for sampling to control the occurrence times of the plural samples of each of the received bits so that the binary bits of the word control the oscillator synchronization and the sampling occurrence times. In response to the spread of values of the control signal over a prolonged time interval being less than a threshold value the presence of data in the bit stream is flagged.

In accordance with another aspect of the invention, a local oscillator is synchronized to a sequence of binary data bits on a signal line and an indication of the presence of data in the sequence is derived by sampling the amplitude on the signal line several times during each of the data bits to derive for each data bit a several-bit binary word. Each bit of the word has a value dependent on the amplitude of the signal on the signal line at the time the sample is taken. In response to the value of the several-bit binary word a control signal indicative of the time deviation between the occurrence time of the bit on the line and the sampling time is derived. The occurrence time of transitions of an output of the local oscillator is controlled in response to the control signal. The occurrence time of the transitions controls when the amplitude on the signal line is sampled. The control signal is a multi-bit binary word having a value dependent on estimates of the noise of the sequence on the signal line and the relative phase difference between bits of the sequence and the local oscillator as indicated by the position and number of plural binary bit transitions in the several-bit word. In response to the spread of values of the control signal over a prolonged time interval exceeding a threshold value the presence of data in the sequence is flagged.

In accordance with another aspect of the invention, the presence of data in a digital bit stream is determined by deriving a control signal for a local oscillator in response to several sampled binary values of a single received bit of the digital bit stream to derive a binary word having several bits. Apparatus for achieving these results includes an addressable memory that is addressed in response to the derived binary word. The memory includes at each address thereof multiple bits representing the amplitude of the control signal. The values of the multiple bits at each address are an indication of the relative phase difference between the digital bit stream and the local oscillator as indicated by the number and positions of binary bit transitions of the binary bits for the address. A means responsive to the memory derives an indication of the spread of values of the control signal over many bits of the digital bit stream. In addition, means responsive to the indicated spread of values flags the presence of data in the bit stream in response to the spread of values being less than a threshold value.

The value at each address is also an estimate of the noise of each received bit of the digital bit stream. The values of the multiple bits at each address are determined, in a preferred embodiment, by mapping the values of the bits of the several bit binary word into a further multi-bit word having a single binary bit transition and combining the further multi-bit binary word with an estimate of the noise associated with the multi-bit binary word as determined by the number of binary bit transitions of the several bit binary word.

According to a further aspect of the invention, time baseline jitter is substantially reduced, if not eliminated. To these ends, control signals for a local oscillator are derived in response to several sampled values of received bits of a digital bit stream such that a received bit is sampled several times during the duration of the single received bit to derive a binary word having several bits. An addressable memory is addressed in response to the derived binary word. The memory includes at each address thereof multiple bits representing the amplitude of the control signal. The values of the multiple bits at each address are an indication of the relative phase difference between the digital bit stream and the local oscillator. The multiple bits representing the control signal amplitude are averaged over many bits of the received digital bit stream. The frequency of the local oscillator is changed from a nominal value to a value determined by the average value from time to time and is immediately thereafter returned to the nominal value. The frequency of the local oscillator controls the times when the received bit is sampled.

The above and still further objects, features and advantages of the present invention will become apparent upon consideration of the following detailed description of a specific embodiment thereof, especially when taken in conjunction with the accompanying drawings.

DESCRIPTION OF THE PREFERRED EMBODIMENT

Figure 1:
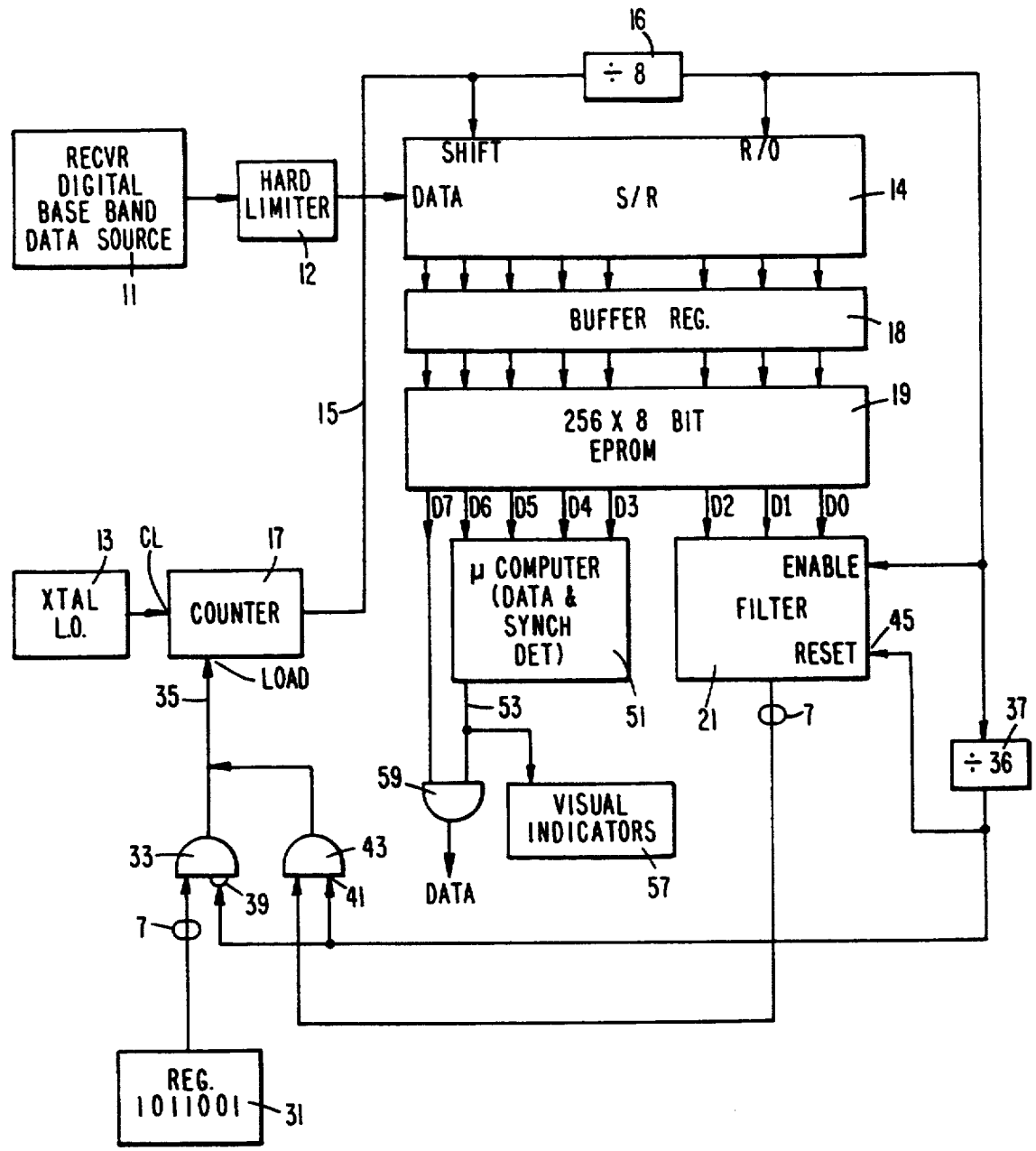
FIG. 1 is a block diagram of a preferred embodiment of the invention.

Reference is now made to FIG. 1 wherein digital baseband data source 11, such as derived from a radio receiver carrier recovery loop, derives a digital signal that is applied to hard limiter 12. The signal derived from source is a bi-level source, varying between zero volts and a predetermined nominal voltage, e.g., +5 volts. Because of component and manufacturing tolerances, different individual units of source 11 produce outputs that differ slightly from the predetermined nominal value; e.g., the +5 volt nominal output voltage is typically in the range of 4.9 to 5.1 volts.

Limiter 12 derives a non-return to zero (NRZ) digital serial data stream having bit values typically representing alpha and numeric values that, in a noiseless transmission link, are replicas of alpha and numeric values derived from a keyboard at a remote transmitter. However, because of noise in the communication link between the transmitter and the receiver of FIG. 1 the signal derived by hard limiter 12 is not, in actuality, a replica of the binary signals at the transmitter. The variations in nominal output voltage of source 11, when combined with the noise in the link, have a tendency to bias the output of hard limiter 12 in the positive or negative direction, so that there is a tendency to detect a greater number of binary ones or zeros than are actually in the originally transmitted data.

The apparatus illustrated in FIG. 1 responds to the signal derived by hard limiter 12 to determine the value of each bit in the bit stream and to synchronize the phase of a signal derived from crystal local oscillator 13 to the phase of the output signal of hard limiter 12, despite the fact that there may be substantial noise on the output of the hard limiter. The noise is reflected in transitions in the output of the hard limiter. The transitions typically occur at a frequency greater than the frequency of the binary bits derived from the transmitter; the transitions usually are at intermediate times between the beginning and end of each received bit.

To these ends, the binary value of each received binary bit derived by hard limiter 12 is sampled several times to derive a several bit digital word having a binary value commensurate with the binary value of each sample. In the preferred, specifically described embodiment, each bit derived by limiter 12 is sampled eight times during the bit.

To sample the output of hard limiter 12, the hard limiter output signal is applied to a data input of shift register 14, having a shift input responsive to a clock signal on lead 15. The clock signal on lead 15 is supplied to an enable readout (R/O) input of shift register 14 via divide by eight frequency divider 16. The count stored in shift register 14 is cleared from the shift register shortly after the contents of the shift register are read-out, by circuitry well known to those skilled in the art.

The signal on lead 15 has a frequency eight times that of the bit rate at the output of hard limiter 12, a result achieved by supplying the output of crystal oscillator 13 to a clock input of settable counter 17. The count of counter 17 is normally set to a value of 89, to divide the frequency of crystal local oscillator 13 by a factor of 90. Oscillator 13 derives an output that is applied to the clock (CL) input of counter 17. For maximum phase adjustments of the clock signal on lead 15 and the data bits derived from limiter 12, counter 17 is set to counts of 83 and 97, respectively. Counter 17 is periodically set, for a period of one data bit, anywhere from 83 to 97, dependent on the average phase displacement between the outputs of limiter 12 and divider 16 over an averaging interval equal to the period between adjacent settings of the counter.

The eight sampled values for each bit at the output of hard limiter 12 are supplied by shift register 14 to buffer register 18. The signal in buffer register 18 addresses erasable programmable read only memory (EPROM) 19.

Memory 19 has an eight bit address input and $2^8 = 256$ data containing addresses. At each of the 256 addresses of memory 19 is stored a different eight bit data word. Each eight bit data word in memory 19 is arranged as follows:

bits D0–D2 (the three least significant bits) form a three bit subword for periodic control of the phase of the signal supplied to lead 15;

bit D7 is a hard decision data bit to indicate the binary value of each received data bit supplied by hard limiter 12 to shift register 14, as indicated by the eight samples of each received bit;

bits D4–D6 indicate the absolute value of the deviation of bits D0–D2 of the particular word from a nominal zero correction value of 4 for counter 17; e.g., if D0, D1, D2 are respectively 000, D4, D5, D6 are respectively 100; if D0, D1, D2 are respectively 100, D4, D5, D6 are respectively 000; if D0, D1, D2 are respectively 111, D4, D5, D6 are respectively 011;

D3 indicates if the values of D4–D6 of the particular word are to be used to calculate the spread of correction values; D3=1 if the values of D0–D2 are to be used; D3=0 if the word at the particular address in memory 19 is excessively noisy (e.g. has more than three binary transitions) or bits D4, D5, D6 at the address respectively have values of 000.

The 256 addresses in memory 19 are addressed by the eight address bits in register 18; hence, the eight samples of the binary value of the output of hard limiter 12 control which combination of bits D0–D7 is derived on the eight bit output bus of memory 19. The values in memory 19 are arranged to compensate for noise in the output of hard limiter 12 during each data bit.

The algorithm for constructing the binary value at each of the 256 addresses in memory 19 involves mapping the eight samples for each data bit at the output of hard limiter 12 into a theoretical value for the samples forming a single data bit. From this theoretical value, the values of bits D0–D7 are determined. The algorithm, based on the transmission properties of the communication link between the transmitter and receiver, is designed to avoid ambiguity. The algorithm for one particular situation is indicated on enclosed Table I.

TABLE I

```
                                   76543210  = DATA BIT#
         00000000 MAPS TO 00000000 SO LOOKUP 00000100
         00000001 MAPS TO 00000001 SO LOOKUP 00011011
         00000010 MAPS TO 00000001 SO LOOKUP 00000100
         00000011 MAPS TO 00000011 SO LOOKUP 00101010
         00000100 MAPS TO 00000001 SO LOOKUP 00000100
         00000101 MAPS TO 00000011 SO LOOKUP 00011011
         00000110 MAPS TO 00000011 SO LOOKUP 00011011
         00000111 MAPS TO 00000111 SO LOOKUP 00111001
         00001000 MAPS TO 00000011 SO LOOKUP 00000100
         00001001 MAPS TO 00000011 SO LOOKUP 00011011
         00001010 MAPS TO 00000011 SO LOOKUP 00000100
         00001011 MAPS TO 00000111 SO LOOKUP 00011011
         00001100 MAPS TO 00000011 SO LOOKUP 00000100
         00001101 MAPS TO 00000111 SO LOOKUP 00011011
         00001110 MAPS TO 00000011 SO LOOKUP 00000100
         00001111 MAPS TO 00001111 SO LOOKUP 01001000
         00010000 MAPS TO 11000000 SO LOOKUP 00000100
         00010001 MAPS TO 00000111 SO LOOKUP 00000100
         00010010 MAPS TO 00000011 SO LOOKUP 00000100
         00010011 MAPS TO 00000111 SO LOOKUP 00011011
         00010100 MAPS TO 00000011 SO LOOKUP 00000100
         00010101 MAPS TO 00000111 SO LOOKUP 00000100
         00010110 MAPS TO 00000111 SO LOOKUP 00000100
         00010111 MAPS TO 00001111 SO LOOKUP 00101010
         00011000 MAPS TO 00000011 SO LOOKUP 00000100
         00011001 MAPS TO 00000111 SO LOOKUP 00000100
         00011010 MAPS TO 00000111 SO LOOKUP 00000100
         00011011 MAPS TO 00001111 SO LOOKUP 00101010
         00011100 MAPS TO 00000111 SO LOOKUP 00000100
         00011101 MAPS TO 00000111 SO LOOKUP 00000100
         00011110 MAPS TO 01111111 SO LOOKUP 10000100
         00011111 MAPS TO 00011111 SO LOOKUP 10111111
         00100000 MAPS TO 10000000 SO LOOKUP 00000100
         00100001 MAPS TO 10000000 SO LOOKUP 00000100
         00100010 MAPS TO 00000000 SO LOOKUP 00000100
         00100011 MAPS TO 00001111 SO LOOKUP 00011011
         00100100 MAPS TO 00000000 SO LOOKUP 00000100
         00100101 MAPS TO 00000111 SO LOOKUP 00000100
         00100110 MAPS TO 00000111 SO LOOKUP 00000100
         00100111 MAPS TO 00001111 SO LOOKUP 00101010
                              16
         00101000 MAPS TO 11000000 SO LOOKUP 00000100
         00101001 MAPS TO 00000111 SO LOOKUP 00000100
         00101010 MAPS TO 00000111 SO LOOKUP 00000100
         00101011 MAPS TO 00001111 SO LOOKUP 00011011
         00101100 MAPS TO 00000111 SO LOOKUP 00000100
         00101101 MAPS TO 00001111 SO LOOKUP 00000100
         00101110 MAPS TO 00111111 SO LOOKUP 10000100
         00101111 MAPS TO 00011111 SO LOOKUP 10011101
         00110000 MAPS TO 11000000 SO LOOKUP 00000100
         00110001 MAPS TO 00000111 SO LOOKUP 00000100
         00110010 MAPS TO 00000111 SO LOOKUP 00000100
         00110011 MAPS TO 00001111 SO LOOKUP 00011011
         00110100 MAPS TO 11111110 SO LOOKUP 10000100
```

TABLE I-continued

```
00110101 MAPS TO 00001111 SO LOOKUP 00000100
00110110 MAPS TO 00111111 SO LOOKUP 10000100
00110111 MAPS TO 00011111 SO LOOKUP 10011101
00111000 MAPS TO 11111110 SO LOOKUP 10000100
00111001 MAPS TO 00001111 SO LOOKUP 00000100
00111010 MAPS TO 11111111 SO LOOKUP 10000100
00111011 MAPS TO 00001111 SO LOOKUP 00011011
00111100 MAPS TO 11111111 SO LOOKUP 10000100
00111101 MAPS TO 11111111 SO LOOKUP 10000100
00111110 MAPS TO 01111111 SO LOOKUP 10000100
00111111 MAPS TO 00111111 SO LOOKUP 10101110
01000000 MAPS TO 10000000 SO LOOKUP 00000100
01000001 MAPS TO 00000000 SO LOOKUP 00000100
01000010 MAPS TO 00000000 SO LOOKUP 00000100
01000011 MAPS TO 00000000 SO LOOKUP 00000100
01000100 MAPS TO 00000000 SO LOOKUP 00000100
01000101 MAPS TO 00000001 SO LOOKUP 00000100
01000110 MAPS TO 00000001 SO LOOKUP 00000100
01000111 MAPS TO 00011111 SO LOOKUP 10000100
01001000 MAPS TO 11000000 SO LOOKUP 00000100
01001001 MAPS TO 00000001 SO LOOKUP 00000100
01001010 MAPS TO 00000001 SO LOOKUP 00000100
01001011 MAPS TO 00001111 SO LOOKUP 00000100
01001100 MAPS TO 00000001 SO LOOKUP 00000100
01001101 MAPS TO 00001111 SO LOOKUP 00000100
01001110 MAPS TO 00111111 SO LOOKUP 10000100
01001111 MAPS TO 00011111 SO LOOKUP 10011101
01010000 MAPS TO 11000000 SO LOOKUP 00000100
01010001 MAPS TO 10000000 SO LOOKUP 00000100
01010010 MAPS TO 10000000 SO LOOKUP 00000100
01010011 MAPS TO 00001111 SO LOOKUP 00000100
01010100 MAPS TO 11100000 SO LOOKUP 00000100
01010101 MAPS TO 00001111 SO LOOKUP 00000100
01010110 MAPS TO 00111111 SO LOOKUP 10000100
01010111 MAPS TO 00011111 SO LOOKUP 10000100
01011000 MAPS TO 11100000 SO LOOKUP 00000100
01011001 MAPS TO 00001111 SO LOOKUP 00000100
01011010 MAPS TO 11111111 SO LOOKUP 10000100
01011011 MAPS TO 00011111 SO LOOKUP 10000100
01011100 MAPS TO 11111111 SO LOOKUP 10000100
01011101 MAPS TO 01111111 SO LOOKUP 10000100
01011110 MAPS TO 01111111 SO LOOKUP 10001100
01011111 MAPS TO 00111111 SO LOOKUP 10011101
01100000 MAPS TO 11000000 SO LOOKUP 00011101
01100001 MAPS TO 10000000 SO LOOKUP 00000100
01100010 MAPS TO 10000000 SO LOOKUP 00000100
01100011 MAPS TO 00001111 SO LOOKUP 00000100
01100100 MAPS TO 11100000 SO LOOKUP 00000100
01100101 MAPS TO 00001111 SO LOOKUP 00000100
01100110 MAPS TO 00111111 SO LOOKUP 10000100
01100111 MAPS TO 00011111 SO LOOKUP 10000100
01101000 MAPS TO 11100000 SO LOOKUP 00000100
01101001 MAPS TO 11111100 SO LOOKUP 10000100
01101010 MAPS TO 11111100 SO LOOKUP 10000100
01101011 MAPS TO 00011111 SO LOOKUP 10000100
01101100 MAPS TO 11111100 SO LOOKUP 10000100
01101101 MAPS TO 01111111 SO LOOKUP 10000100
01101110 MAPS TO 01111111 SO LOOKUP 10000100
01101111 MAPS TO 00111111 SO LOOKUP 10011101
01110000 MAPS TO 11000000 SO LOOKUP 00000100
01110001 MAPS TO 11111100 SO LOOKUP 10000100
01110010 MAPS TO 11111100 SO LOOKUP 10000100
01110011 MAPS TO 00011111 SO LOOKUP 10000100
01110100 MAPS TO 11111100 SO LOOKUP 10000100
01110101 MAPS TO 11111110 SO LOOKUP 10000100
01110110 MAPS TO 11111110 SO LOOKUP 10000100
01110111 MAPS TO 00011111 SO LOOKUP 10000100
01111000 MAPS TO 11111110 SO LOOKUP 10000100
01111001 MAPS TO 11111110 SO LOOKUP 10000100
01111010 MAPS TO 11111110 SO LOOKUP 10000100
01111011 MAPS TO 11111110 SO LOOKUP 10000100
01111100 MAPS TO 11111110 SO LOOKUP 10000100
01111101 MAPS TO 11111111 SO LOOKUP 10000100
01111110 MAPS TO 11111111 SO LOOKUP 10000100
01111111 MAPS TO 01111111 SO LOOKUP 10011101
10000000 MAPS TO 10000000 SO LOOKUP 00011101
10000001 MAPS TO 00000000 SO LOOKUP 00000100
10000010 MAPS TO 00000000 SO LOOKUP 00000100
10000011 MAPS TO 00000001 SO LOOKUP 00000100
10000100 MAPS TO 00000001 SO LOOKUP 00000100
10000101 MAPS TO 00000001 SO LOOKUP 00000100
```

TABLE I-continued

```
10000110 MAPS TO 00000001 SO LOOKUP 00000100
10000111 MAPS TO 00000001 SO LOOKUP 00000100
10001000 MAPS TO 11100000 SO LOOKUP 00000100
10001001 MAPS TO 00000001 SO LOOKUP 00000100
10001010 MAPS TO 00000001 SO LOOKUP 00000100
10001011 MAPS TO 00000011 SO LOOKUP 00000100
10001100 MAPS TO 00000001 SO LOOKUP 00000100
10001101 MAPS TO 00000011 SO LOOKUP 00000100
10001110 MAPS TO 00000011 SO LOOKUP 00000100
10001111 MAPS TO 00111111 SO LOOKUP 10000100
10010000 MAPS TO 11000000 SO LOOKUP 00011101
10010001 MAPS TO 10000000 SO LOOKUP 00000100
10010010 MAPS TO 10000000 SO LOOKUP 00000100
10010011 MAPS TO 00000011 SO LOOKUP 00000100
10010100 MAPS TO 11100000 SO LOOKUP 00000100
10010101 MAPS TO 00000011 SO LOOKUP 00000100
10010110 MAPS TO 00000011 SO LOOKUP 00000100
10010111 MAPS TO 00011111 SO LOOKUP 10000100
10011000 MAPS TO 11100000 SO LOOKUP 00000100
10011001 MAPS TO 00000011 SO LOOKUP 00000100
10011010 MAPS TO 11111111 SO LOOKUP 10000100
10011011 MAPS TO 00011111 SO LOOKUP 10000100
10011100 MAPS TO 11111111 SO LOOKUP 10000100
10011101 MAPS TO 01111111 SO LOOKUP 10000100
10011110 MAPS TO 01111111 SO LOOKUP 10000100
10011111 MAPS TO 00111111 SO LOOKUP 10011101
10100000 MAPS TO 11000000 SO LOOKUP 00011101
10100001 MAPS TO 10000000 SO LOOKUP 00000100
10100010 MAPS TO 10000000 SO LOOKUP 00000100
10100011 MAPS TO 00000000 SO LOOKUP 00000100
10100100 MAPS TO 11100000 SO LOOKUP 00000100
10100101 MAPS TO 00000000 SO LOOKUP 00000100
10100110 MAPS TO 11110000 SO LOOKUP 10000100
10100111 MAPS TO 00011111 SO LOOKUP 10000100
10101000 MAPS TO 11100000 SO LOOKUP 00000100
10101001 MAPS TO 11000000 SO LOOKUP 00000100
10101010 MAPS TO 11110000 SO LOOKUP 10000100
10101011 MAPS TO 00011111 SO LOOKUP 10000100
10101100 MAPS TO 11110000 SO LOOKUP 10000100
10101101 MAPS TO 01111111 SO LOOKUP 10000100
10101110 MAPS TO 01111111 SO LOOKUP 10000100
10101111 MAPS TO 00111111 SO LOOKUP 10000100
10110000 MAPS TO 11100000 SO LOOKUP 00011101
10110001 MAPS TO 11000000 SO LOOKUP 00000100
10110010 MAPS TO 11110000 SO LOOKUP 10000100
10110011 MAPS TO 00011111 SO LOOKUP 10000100
10110100 MAPS TO 11110000 SO LOOKUP 10000100
10110101 MAPS TO 11111110 SO LOOKUP 10000100
10110110 MAPS TO 11111110 SO LOOKUP 10000100
10110111 MAPS TO 00111111 SO LOOKUP 10000100
10111000 MAPS TO 11100000 SO LOOKUP 00000100
10111001 MAPS TO 11111110 SO LOOKUP 10000100
10111010 MAPS TO 11111110 SO LOOKUP 10000100
10111011 MAPS TO 11111111 SO LOOKUP 10000100
10111100 MAPS TO 11111111 SO LOOKUP 10000100
10111101 MAPS TO 11111111 SO LOOKUP 10000100
10111110 MAPS TO 11111111 SO LOOKUP 10000100
10111111 MAPS TO 01111111 SO LOOKUP 10000100
11000000 MAPS TO 11000000 SO LOOKUP 00101110
11000001 MAPS TO 10000000 SO LOOKUP 00000100
11000010 MAPS TO 00000000 SO LOOKUP 00000100
11000011 MAPS TO 00000000 SO LOOKUP 00000100
11000100 MAPS TO 11110000 SO LOOKUP 10011011
11000101 MAPS TO 00000000 SO LOOKUP 00000100
11000110 MAPS TO 11110000 SO LOOKUP 10000100
11000111 MAPS TO 00000001 SO LOOKUP 00000100
11001000 MAPS TO 11100000 SO LOOKUP 00011101
11001001 MAPS TO 11000000 SO LOOKUP 00000100
11001010 MAPS TO 11110000 SO LOOKUP 10000100
11001011 MAPS TO 00000001 SO LOOKUP 00000100
11001100 MAPS TO 11110000 SO LOOKUP 10011011
11001101 MAPS TO 01111111 SO LOOKUP 10000100
11001110 MAPS TO 01111111 SO LOOKUP 10000100
11001111 MAPS TO 00111111 SO LOOKUP 10000100
11010000 MAPS TO 11100000 SO LOOKUP 00011101
11010001 MAPS TO 11000000 SO LOOKUP 00000100
11010010 MAPS TO 11110000 SO LOOKUP 10000100
11010011 MAPS TO 11111000 SO LOOKUP 10000100
11010100 MAPS TO 11110000 SO LOOKUP 10011011
11010101 MAPS TO 11111000 SO LOOKUP 10000100
11010110 MAPS TO 11111000 SO LOOKUP 10000100
```

TABLE I-continued

```
11010111 MAPS TO 00111111 SO LOOKUP 10000100
11011000 MAPS TO 11110000 SO LOOKUP 10101010
11011001 MAPS TO 11111000 SO LOOKUP 10000100
11011010 MAPS TO 11111000 SO LOOKUP 10000100
11011011 MAPS TO 11111111 SO LOOKUP 10000100
11011100 MAPS TO 11110000 SO LOOKUP 10011011
11011101 MAPS TO 11111111 SO LOOKUP 10000100
11011110 MAPS TO 01111111 SO LOOKUP 10000100
11011111 MAPS TO 01111111 SO LOOKUP 10000100
11100000 MAPS TO 11100000 SO LOOKUP 00111111
11100001 MAPS TO 10000000 SO LOOKUP 00000100
11100010 MAPS SO 11111000 SO LOOKUP 10000100
11100011 MAPS TO 11111000 SO LOOKUP 10000100
11100100 MAPS TO 11110000 SO LOOKUP 10101010
11100101 MAPS TO 11111000 SO LOOKUP 10000100
11100110 MAPS TO 11111000 SO LOOKUP 10000100
11100111 MAPS TO 00111111 SO LOOKUP 10000100
11101000 MAPS TO 11110000 SO LOOKUP 10101010
11101001 MAPS TO 11111000 SO LOOKUP 10000100
11101010 MAPS TO 11111000 SO LOOKUP 10000100
11101011 MAPS TO 11111100 SO LOOKUP 10000100
11101100 MAPS TO 11111000 SO LOOKUP 10011011
11101101 MAPS TO 11111100 SO LOOKUP 10000100
11101110 MAPS TO 11111000 SO LOOKUP 10000100
11101111 MAPS TO 00111111 SO LOOKUP 10000100
11110000 MAPS TO 11110000 SO LOOKUP 11001111
11110001 MAPS TO 11111100 SO LOOKUP 10000100
11110010 MAPS TO 11111000 SO LOOKUP 10011011
11110011 MAPS TO 11111100 SO LOOKUP 10000100
11110100 MAPS TO 11111000 SO LOOKUP 10011011
11110101 MAPS TO 11111100 SO LOOKUP 10000100
11110110 MAPS TO 11111100 SO LOOKUP 10011011
11110111 MAPS TO 11111100 SO LOOKUP 10000100
11111000 MAPS TO 11111000 SO LOOKUP 10111001
11111001 MAPS TO 11111100 SO LOOKUP 10011011
11111010 MAPS TO 11111100 SO LOOKUP 10011011
11111011 MAPS TO 11111110 SO LOOKUP 10000100
11111100 MAPS TO 11111100 SO LOOKUP 10101010
11111101 MAPS TO 11111110 SO LOOKUP 10000100
11111110 MAPS TO 11111110 SO LOOKUP 10011011
11111111 MAPS TO 11111111 SO LOOKUP 10000100
```

The first (left hand) column in each row of eight binary zero and one values in Table I indicates the values of the eight samples stored in shift register 14 for a received data bit derived from hard limiter 12. The second (center) set of columns of eight bits in Table I indicates the theoretical eight bit word into which the received word on the same row is mapped or transformed. Only one binary value transition occurs for each word of the second column. The third (right hand) set of columns of eight binary ones and zeros in Table I indicates the values of bits D7–D0 readout from memory 19 for the sequence in the first column.

If the samples stored in shift register 14 for an output bit of hard limiter 12 have the values: 00000000, bits D7–D0 respectively have values of 00000100. The zero value for bit D7 indicates that the hard decision data bit has a value of zero. The 000 values for bits D4–D6 indicate that there is a zero correction from nominal for counter 17 associated with the data bit. The zero value for bit D3 indicates that the D0–D2 bits are not to be accumulated to determine if data and synchronization are present for the signal derived from limiter 12. The 100 values for bits D2,D1,D0 indicate counter 17 is to be supplied with the nominal correction of four.

In contrast, if the eight samples stored in shift register 14 have values of 01010101 no meaningful data concerning the received data word can be derived from these samples. An arbitrary value of zero is assigned to hard decision bit D7 under these circumstances and the phase of the clock signal on lead 15 is maintained at a nominal median position, as indicated by the values of 1,0,0 for bits D2, D1 and D0; consequentially bits D4, D5, D6 respectively have values of 000. Bit D3 has a binary zero value under these circumstances, to indicate that bits D4, D5, D6 are not to be considered in determining the presence of synchronization and data in the signal derived from limiter 12.

Next consider the situation wherein the output of hard limiter 12 has one transition during a binary bit, at a sample between the first and second samples. Such a situation is illustrated by the sequence 00000001 in the first column at the second row of Table I. Such a sequence occurs in a noiseless communication link in response to a one sample displacement between the phase of the output of hard limiter 12 and the clock signal on lead 15. In such a situation, at the 00000001 address in memory 19 is stored the sequence 00011011. The zero value of bit D7 indicates that the hard decision data bit has a value of zero, as would be expected in a sequence wherein seven binary zeros are followed by a single binary one. Bits D0–D2 respectively have values of 110 to indicate that a command signal for the phase change of oscillator is to be three units, while bits D6,D5,D4 have values of 001 to indicate that the command signal differs from the nominal value of 4 by a single unit. Bit D3 has a value of 1 to indicate that the D4–D6 bits are accumulated to determine synchronization and data detection.

Next assume that due to noise, the eight samples stored in shift register 14 for the output of hard limiter 12 have values of 00000010 as indicated by the address in the first column and the third row of Table I. These sample values are mapped, in accordance with the algorithm, into a mapped binary word 00000001, as indicated by the center column, third row of Table I. At the address assigned to 00000010 are stored the binary values 0000100, as indicated by the third row, right column of Table I. This results in the same control action as occurs in response to the hard limiter deriving the 00000000 sequence. In other words, it is assumed that the D1=1 output of shift register 14 is due to noise and that the signal actually received by receiver 11 is a binary zero in synchronization with the output of counter 17.

If there is exact synchronization between the signal on lead 15 and the output of hard limiter 12, whereby all of the bits in shift register 14 are either binary zero or binary one, bits D2,D1,D0 respectively have 100 values. In averaging filter 21, bits D0–D2, selectively representing values of 0–7, are accumulated over a predetermined interval, e.g. 36 data bits; the accumulated value is divided by a predetermined factor, e.g., 18, and subtracted from the maximum count, e.g. 97, of counter 17 to derive a control signal that periodically changes the frequency division factor of counter 17 from the lowest division factor of 83.

If there is more than one binary zero to one or binary one to zero transition of the samples stored in shift register 14, the values of D0–D2 for the corresponding address in memory 19 are determined by the position of the transition of the mapped word in the second column of Table I and the noise level of the samples in the shift register, based on empirical data. For example, the control signal for counter 17 is set to a nominal value of 4 for the bit sequence 00000010, having two binary zero to binary one and binary one to binary zero transitions, even though that sequence is mapped into the sequence 00000001. Hence, for control of the clock signal on lead 15, sample sequence 00000010 maps into 00000001.

Sample sequence 00011010, which maps to 00000111, is considered to be so noise-laden that the control signal for counter 17 also has the nominal value of 4. In contrast, sample sequence 00100011 which maps into the sequence 00001111, causes the values of bits D2, D1, D0 to be respectively 011 associated with a count of 3 for the control signal of counter 17. The count of 3 for the control signal of counter 17 causes a slight phase advance of the clock signal on lead 15 relative to the nominal phase of the clock signal on lead 15 as a result of the stated combination.

With counter 17 set at its nominal value of 89, the counter responds to local oscillator 13 to derive on lead 15 eight equally spaced positive going transitions during a binary output bit of hard limiter 12. These positive transitions are coupled to the shift input of shift register 14 so that the output of hard limiter 12 is effectively sampled each time a positive going transition occurs in the output of counter 17. If exact synchronization and phase lock have been achieved between the output of hard limiter 12 and the clock signal on lead 15, one out of every eight transitions on lead 15 occurs simultaneously with the beginning and end of each data output bit of the limiter. If counter 17 is loaded with a count of 88, the clock signal on lead 15 is shifted by one-fourteenth of the duration of each sample stored in shift register 14 for each data bit at the output of limiter 12. If the count stored in counter 17 has a value of 83 or 97, the clock signal on lead 15 is shifted by about one-half of one sample over the duration of one data bit derived from limiter 12.

To maintain the time base for the sampling times of the output of hard limiter 12 as stable as possible, the output of hard limiter 12 is normally sampled at a predetermined frequency of 128.000 kHz, which applies eight samples during each of the bits derived at 16 kHz from hard limiter 12. After the correction values indicated by bits D0–D2 have been derived over a predetermined interval, 36 data bits derived from hard limiter 12 in the preferred embodiment, the sample rate of the output of hard limiter 12 by shift register 14 is adjusted for the duration of only one bit. After the one data bit correction interval has lapsed, the sampling rate returns to 128.000 kHz. Since there are eight samples taken of each data bit derived from hard limiter 12, the 16 kilobit output of the hard limiter 12 is sampled at a rate of 128.000 kHz. During the data bit when the output of counter 17 on lead 15 is corrected, the frequency of the output of the counter can be anywhere in the range from 128.24 kHz to 127.6812 kHz.

To these ends, a frequency division factor of 90 (resulting from preloading counter 17 with a count of 89) is normally loaded by register 31 into counter 17 by way of gate 33. The count of 89, represented in register 31 by the binary sequence 1011001, is supplied via gate 33 to load input 35 of counter 17 on a seven-bit bus. Loading a count of 89 into counter 17 causes the output of the counter to have a frequency of 128.000 kHz.

To enable the correction factor resulting from an accumulation of the D0–D2 bits from memory 19 to be applied to the seven-bit bus connected to load input 35 of counter 17 once every 36 data bits derive from hard limiter 12, the output of frequency divider 16 is applied to frequency divider 37. Frequency divider 37 thus derives a pulse having a duration of one data bit supplied by hard limiter 12 to the data input of shift register 14 once for 36 of the data bits. The pulse derived by divider 37 is applied in parallel to inhibit input 39 of gate 33, to decouple the output of register 31 from load input 35 of counter 17. Simultaneously, the pulse is applied to enable input 41 of gate 43, so that the seven-bit output of filter 21, indicative of the correction factor to be supplied to counter 17, is coupled to the counter load input. In response to the trailing edge of the pulse derived by divider 37, filter 21 is reset, a result achieved by connecting the output of divider 37 to reset input 45 of filter 21.

The output of filter 21 is a seven-bit signal having binary values which vary from a decimal value of 83 to a decimal value of 97 (having a binary value of 1100001). If exact synchronism exists between the output of counter 17 and the output of hard limiter 12, the correction value supplied by filter 21 to the counter load input by way of gate 43 has a decimal value of 89.

To determine if data are present on the output of hard limiter 12 and if these data are synchronized to the output of the local oscillator including crystal oscillator 13 and counter 17, bits D3–D6 of memory 19 are supplied to microcomputer 51. Microcomputer 51 is programmed as indicated by the flow diagram of FIG. 2 to derive binary zero and one indications on lead 53 respectively indicative of the absence and presence of data detection. The signal on lead 53 is supplied to conventional visual indicators 57 which are energized in response to binary zero and one levels on lead 53 to indicate the absence and presence of data in the output of receiver 11. The data detect signal on lead 53 is combined in AND gate 59 with data bit D7, as derived from memory 19. In response to the presence of a binary one level on lead 53, data indications at the D7 output of memory 19 are derived at the output of gate 59 and supplied to appropriate decoding circuitry of a type known to those skilled in the art.

In general, microcomputer 51 is programmed to derive an indication of the spread of values of data bits D4–D6 when data bit D3 has a value of one over a prolonged time interval, e.g., over an interval of 360 output words from memory 19 having D3=1 values. Because bits D4–D6 are programmed to indicate the deviation from the nominal value of correction bits D0–D2, a very simple accumulation process can be used to provide the spread of values indication, which is roughly indicative of the variance of the correction values. The actual variance of the correction values over the 360 word interval would be computed by (a) determining the average value of all the correction values, (b) determining the difference of each correction value from the average, (c) squaring the difference, (d) summing the squared values and (e) dividing the sum of the squared differences by the number of correction values used to determine the variance. Such a procedure is relatively complex and requires a substantial amount of computer time and memory. These complex operations are obviated by programming values D4–D6 so they indicate the absolute value of the deviation of the values of bits D0–D2 from the nominal value thereof (4) and by accumulating these pre-programmed deviations as they are derived from memory 19.

Figure 2:
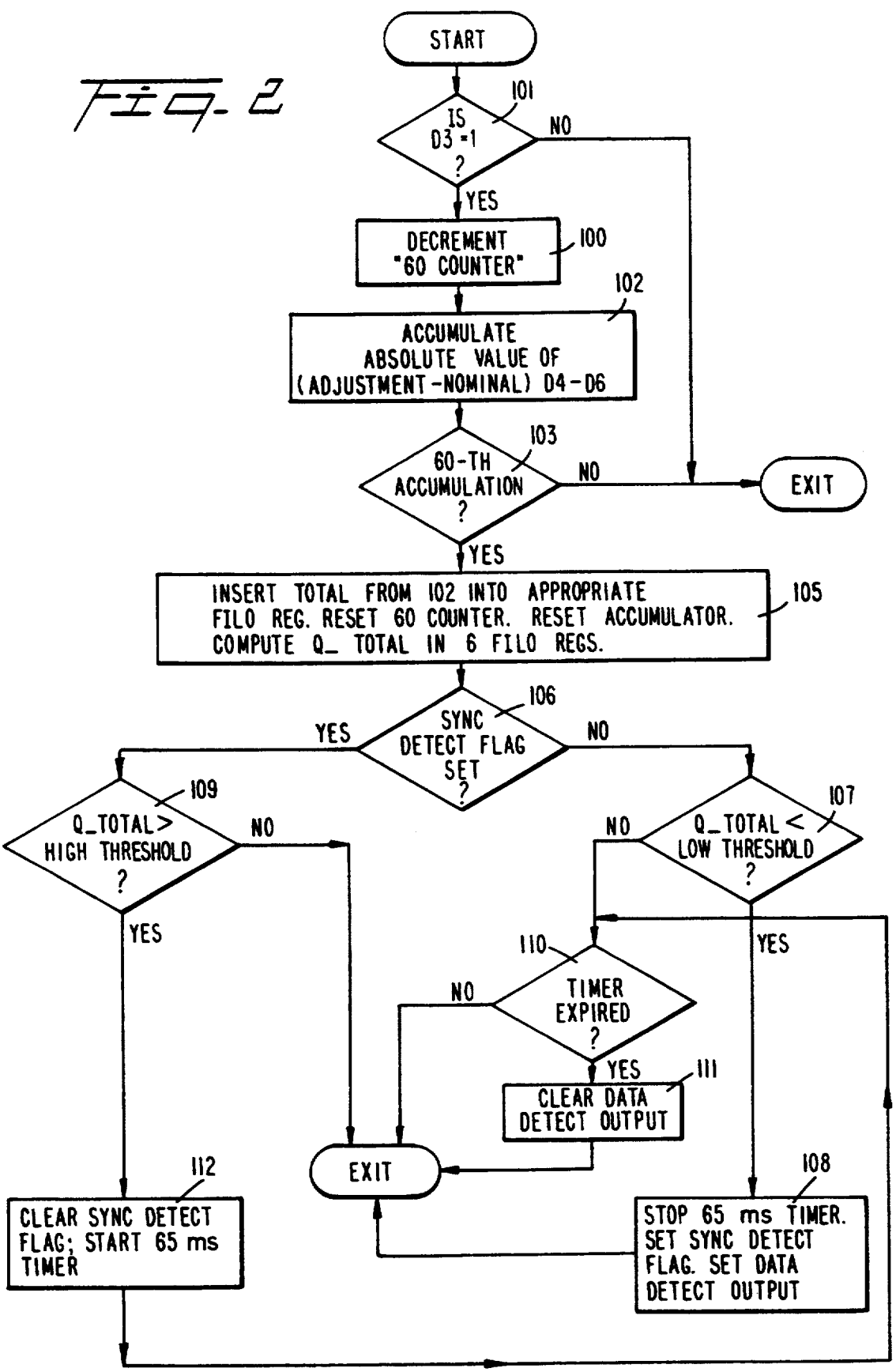
FIG. 2 is a flow diagram of certain operations performed by a microcomputer included in FIG. 1, for determining the presence and/or absence of data and synchronization in the received signal.

Reference is now made to FIG. 2 of the drawing, a flow diagram of operations performed by microcomputer 51, FIG. 1, for determining the presence and/or absence of data in the signal derived from receiver 11 and for determining if there is synchronization of the signal derived from the receiver with the output of counter 17. Initially, when the receiver is turned on, a flag in microcomputer 51 indicating the presence of synchronization and an output indicating the presence of data are cleared so that in response to the receiver being initially turned on, the synchronization detect flag and data detect output are not set. The determinations of data detect and synchronization detect are thereafter updated. Initially a long string (more than 360 bits) of sequential 01 values is transmitted to the receiver to enable proper initial operation of the detection process performed by microcomputer 51.

To perform the detection process, microcomputer 51 is programmed to be an accumulator, adder, count down counter having a maximum count of 59 so it is set at zero when 60 pulses have been applied to it (referred to herein as the "60" counter), a 65 ms timer for deriving an output signal after it has been activated for 65 ms, and six first in—last out (FILO) registers responsive to the accumulator. The accumulator accumulates the values of the D4–D6 bits for 60 consecutive words read from memory 19 having D3=1. After 60 such consecutive words the accumulated value is transferred to the appropriate FILO register. The counts in the FILO registers are added together in the adder to determine a measure of the spread of values of D4–D6 over 360 consecutive words read from memory 19 having D3=1 to control the data detect output on lead 53.

To monitor spread of values and control the flags microcomputer 51 responds, during operation 101, to adjustment bit D3, having a binary value indicative of whether an address read from the memory is to be considered in the determination of spread of values. The "60" counter is incremented during operation 100 each time a "yes" is derived from operation 101. During operation 102, the accumulator of microcomputer 51 responds to output bits D4–D6 from each read out address of memory 19 to accumulate the values of D4–D6, as described supra.

Next a determination is made, during operation 103, as to whether the "60" counter has counted down to zero in response to D3 equaling 1 60 times. In response to a "no" from operations 101 or 103 the program is exited.

In response to a "yes" from operation 103 the program advances to operation 105 during which: (1) the accumulated D4–D6 value in the accumulator for the 60 previous words read from memory 19 having D3=1 is transferred to the appropriate FILO register, (2) the "60" counter is reset to it its initial value of 59, (3) the accumulator for the values of D4–D6 is reset (after transfer of its contents to the appropriate FILO register) and (4) the values in the six FILO registers are added together to derive the indication of the spread of correction values for the 360 most recently received bits derived by receiver 11 resulting in D3=1.

The program then advances to operation 106 to determine whether the sync detect flag has been set. As indicated .Supra, initially the sync detect flag is cleared, so that initially a "no" response is derived during operation 106.

In response to a "no" response being derived during operation 106, a determination is made during operation 107 as to whether the six values in the six FILO register added together during operation 106 (the sum of these six values has a value Q) is less than a low threshold. If the value of Q is less than the low threshold, an indication is provided that the spread of values is sufficiently low that data can be considered as having been received and derived from the output of receiver 11.

In response to operation 107 determining that Q is less than the low threshold, the program proceeds to operation 108, during which: (1) the 65 ms. time is stopped, and (2) the synchronization detection flag and the data detect output on lead 53 are set, causing (1) gate 59 to be enabled so data bits can be read from it and (2) indicator 53 to be appropriately energized. If, however, operation 107 indicates the value of Q is not less than the low threshold, the program advances to operation 110 during which a determination is made as to whether the 65 ms. interval timed by the timer has been completed. In response to operation 110 providing a "yes" result, operation 111 is executed, causing the data detect output on lead 53 to be reset, resulting in gate 59 being disabled and visual indicator 57 being appropriately energized. The program is exited after completion of operation 108 or operation 111 or operation 110 if there is a "no" result from operation 110.

If operation 106 indicates the sync detect flag is set, the program advances to operation 109, at which time a determination is made as to whether Q exceeds a high threshold. If Q exceeds the high threshold, the variance of the corrections has increased to a point such that synchronization no longer exists and data detection may no longer be possible.

In response to operation 109 indicating that Q exceeds the high threshold, the program advances to operation 112, during which (1) the synchronization detection flag is cleared and (2) the 65 ms. timer is started. Then the program advances to operation 110 and possibly operation 111 as described supra. If operation 109 results in a "no" answer being derived, the program is exited.

If the 65 ms. timer times out, the noise level of the received signal derived from receiver 11 is so high that data are assumed to be no longer being received. The program then proceeds to operation 111 during which the data detect output is cleared. This prevents premature disabling of the data detect output. Different thresholds are provided in operations 107 and 109 to provide hysteresis to setting and resetting the data detect output and synchronization flag. Instability in the setting and resetting of these parameters, as is likely to occur for signals having marginal signal to noise ratios, is thus avoided.

While there has been described and illustrated one specific embodiment of the invention, it will be clear that variations in the details of the embodiment specifically illustrated and described may be made without departing from the true spirit and scope of the invention as defined in the appended claims.

We claim:

1. A method of synchronizing a receiver to a digital bit stream subject to noise and detecting if data are in the digital bit stream comprising sampling each bit of the digital bit stream at least several times, addressing a memory with the samples from each bit of the digital bit stream, the memory being programmed to derive plural output bits having values indicative of the amount of correction to be applied to the sampled bits to provide synchronization as a function of the value of the samples addressing the memory, controlling the rate at which bits in the digital bit stream are sampled in response to output bits of the memory indicative of the amount of correction to be applied to the sampled bits to provide synchronization, the amount of correction indicated by the output bits of the memory having a spread of values over a prolonged time interval, determining a measure of the spread of values of the output bits of the memory, and signalling that data are in the digital bit stream in response to said measure of the spread of values being less than a threshold value.

2. The method of claim 1 further comprising adjusting the threshold as a function of the signalled presence of data in the digital bit stream, the threshold being greater when data are signalled as being in the digital bit stream than when data are not in the digital bit stream.

3. The method of claim 1 wherein the memory is programmed so that certain bits at each address indicate the absolute value of the amount of correction to be applied to the sampled bits, said measure of the spread of values being determined by accumulating said absolute values from a series of output bits of the memory.

4. A method of synchronizing a receiver to a signal and detecting if data are in the signal comprising responding to the signal to derive indications of the amount of time shift necessary to achieve synchronization between the receiver and signal, adjusting the receiver to provide synchronization between the receiver and signal in response to the time shift indications, the time shift indications having a spread of values over a prolonged interval, and signalling that data are in the signal in response to a measure of the spread of values being less than a threshold value.

5. The method of claim 4 further including varying the threshold value, the threshold value being varied so it includes hysteresis, the hysteresis being such that in response to data being flagged as being in the signal the threshold value is greater than when data are not signalled as being in the signal.

6. Apparatus for synchronizing an output of a local oscillator to received bits of a digital bit stream and for indicating if data are in the digital bit stream comprising means for sampling the binary value of each of the received bits several predetermined times during each of the received bits to derive for each received bit a several bit binary word representing the sampled values, means responsive to the binary value of the several bit binary word for controlling the local oscillator synchronization, the synchronized local oscillator being connected to the means for sampling to control the occurrence times of the plural samples of each of the received bits so that the binary value of the several bit binary word, including several bit binary words having plural binary bit transitions, controls the oscillator synchronization and the sampling occurrence times to selectively cause sample shifting of the received bits, the extent of the sample shift being determined by estimates of the noise of each of the received bits of the digital bit stream and the relative phase difference between the digital bit stream and the local oscillator as indicated by the number and positions of binary bit transitions in the several bit binary word, the extent of the sample shifts of multiple ones of the several bit binary word having a spread of values over a prolonged time interval, means responsive to the means for controlling for determining a measure of the spread of values and means responsive to the measure of the spread of values of the extent of the sample shifts of the multiple ones of the several bit binary word over the prolonged time interval for signalling the presence of data in the bit stream in response to the measure of the spread of values being less than a threshold value.

7. The apparatus of claim 6 further comprising means for adjusting the threshold as a function of the signalled presence of data in the digital bit stream, the threshold being greater when data are signalled as being in the digital bit stream than when data are not in the digital bit stream.

8. The apparatus of claim 6 wherein the means for controlling includes a memory, the memory being programmed so that certain bits at each address indicate the absolute value of the amount of correction to be applied to the sampled bits, said measure of the spread of values being determined by accumulating said absolute values from a series of output bits of the memory over the prolonged time interval.

9. Apparatus for synchronizing an output of a local oscillator to received bits of a digital bit stream and for indicating if data are in the digital bit stream comprising means for sampling the binary value of each of the received bits several predetermined times during each of the received bits to derive for each received bit a several bit binary word representing the sampled values, an addressable memory addressed in response to the several bit binary word for deriving a control signal having a value determined by estimates of the noise of each of the received bits of the digital bit stream and the relative phase difference between the digital bit stream and the local oscillator as indicated by the number and positions of binary bit transitions in the several bit binary word of the digital bit stream, means responsive to the value of the control signal for controlling the local oscillator synchronization, the synchronized local oscillator being connected to the means for sampling to control the occurrence times of the plural samples of each of the received bits of the digital bit stream so that the binary bits of the several bit binary word control the oscillator synchronization and the sampling occurrence times, the control signal having a spread of values over a prolonged time interval, means responsive to the memory for determining a measure of the spread of values, and means responsive to the measure of the spread of values of the control signal for signalling the presence of data in the bit stream in response to the measure of the spread of values being less than a threshold value.

10. The apparatus of claim 9 wherein the threshold value is subject to change so that in response to said measure of spread of values indicating that data are in the digital bit stream the threshold value is greater than when said measure of spread of values indicates that data are not in the digital bit stream.

11. The apparatus of claim 9 wherein the memory is programmed so that certain bits at each address indicate the absolute value of the amount of correction to be applied to the sampled bits, said measure of the spread of values being determined by accumulating said absolute values from a series of output bits of the memory.

12. A method of synchronizing a local oscillator to a sequence of binary data bits on a signal line and indicating if data are in the sequence, a signal amplitude being derived on the signal line, comprising the steps of sampling the amplitude on the signal line several times during each of the data bits to derive for each data bit a several bit binary word susceptible of having plural bit transitions, each bit of the several bit binary word having a value dependent on the amplitude of the signal on the signal line at the time the sample is taken, responding to the value of the several bit binary word to derive a control signal having a value determined by estimates of the noise of the sequence on the signal line and the relative phase difference between bits of the sequence and the local oscillator as indicated by the number and positions of the bit transitions of the several bit binary word, controlling the occurrence time of transitions of an output of the local oscillator in response to the control signal, the occurrence times of the transitions controlling when the amplitude on the signal line is sampled to selectively cause sample shifting between successive binary data bits on the signal line, the control signal being derived numerous times over a prolonged time interval, the numerous control signals having a spread of values, determining a measure of the spread values, and signalling the presence of data in the sequence in response to the measure of the spread of values being less than a threshold value.

13. The method of claim 12 further comprising adjusting the threshold as a function of the signalled presence of data in the digital bit stream, the threshold being greater when data are signalled as being in the digital bit stream than when data are not in the digital bit stream.

14. The method of claim 12 wherein the local oscillator is controlled with a memory programmed so that certain bits at each address indicate the absolute value of the amount of correction to be applied to the sampled bits, said measure of the spread of values being determined by accumulating said absolute values from a series of output bits of the memory.

15. A method of synchronizing a local oscillator to a sequence of binary data bits on a signal line and indicating if data are in the sequence, a signal amplitude being derived on the signal line, comprising the steps of sampling the amplitude on the signal line several times during each of the data bits to derive for each data bit a several bit binary word, each bit of the several bit binary word having a value dependent on the amplitude of the signal on the signal line at the time the sample is taken, responding to the value of the several bit binary word to derive a control signal indicative of the time deviation between the occurrence time of the binary data bit on the signal line and the sampling time, controlling when transitions occur in an output of the local oscillator in response to the control signal, the occurrence time of the transitions controlling when the amplitude on the signal line is sampled, the control signal being a multi-bit binary word having a value dependent on estimates of the noise of the sequence on the signal line and the relative phase difference between bits of the sequence and the local oscillator as indicated by the position and number of plural binary transitions in the several bit binary word, the control signal being derived numerous times over a prolonged time interval, the numerous control signals having a spread of values, determining a measure of the spread of values, and signalling the presence of data in the sequence in response to the measure of the spread of values being less than a threshold value.

16. The method of claim 15 further comprising adjusting the threshold as a function of the signalled presence of data in the digital bit stream, the threshold being greater when data are signalled as being in the digital bit stream than when data are not in the digital bit stream.

17. The method of claim 15 wherein the control signal is derived with a memory programmed so that certain bits at each address indicate the absolute value of the amount of correction to be applied to the sampled bits, said measure of the spread of values being determined by accumulating said absolute values from a series of output bits of the memory.

18. Apparatus for deriving control signals for a local oscillator in response to several sampled binary values of received data bits of a digital data bit stream such that a single received data bit is sampled several times during the duration of the single received data bit to derive a binary word having several bits and for indicating if the digital bit stream includes data, comprising an addressable memory, means for addressing the memory in response to the derived binary word, the memory including at each address thereof multiple bits controlling the amplitude of the control signal, the value of the multiple bits at each address being an indication of the relative phase difference between each of the received data bits of the digital bit stream and the local oscillator, the memory deriving multiple bit indication for individual bits of the data stream, the multiple bit indications having a spread of values over many bits of the digital data bit stream, means responsive to the memory for determining a measure of the spread of values, and means responsive to the measure of the spread of values for signalling the presence of data in the bit stream in response to the measure of the spread of values being less than a threshold value.

19. The apparatus of claim 18 wherein the value at each address is also an estimate of the noise of each received bit of the digital bit stream as indicated by the number and positions of binary bit transitions of the binary bits of the address.

20. The apparatus of claim 19 wherein the values of the multiple bits at each address are determined by mapping the values of the bits of the several bit binary word into a further multi-bit word having a single binary bit transition and combining the further multi-bit word with an estimate of the noise associated with the multi-bit word as determined by the number of binary bit transitions of the several bit binary word.

21. The apparatus of claim 18 wherein the multiple bits at each address include plural bits representing a single polarity indication of the magnitude of the multiple bits representing the amplitude of the control signal.

22. The apparatus of claim 21 wherein the means for determining a measure of spread of values includes a means for accumulating values associated with the multiple indications over many bits of the digital bit stream.

23. The apparatus of claim 21 wherein one bit at each address has a value that is a function of the noise level associated with the data bit that causes the particular address to be addressed, and the measure of the spread of values is derived by a means responsive only to outputs of the memory that are at addresses wherein the one bit has a predetermined value associated with a noise level less than a threshold value.

24. The apparatus of claim 23 wherein the one bit also has the predetermined value at addresses where the control signal has a predetermined nominal value.

25. Apparatus for deriving control signals for a local oscillator in response to several sampled binary values of received data bits of a digital data bit stream such that a single received data bit is sampled several times during the duration of the single received bit to derive a binary word having several bits, comprising an addressable memory, means for addressing the memory in response to the derived binary word, the memory including at each address thereof multiple bits representing the amplitude of the control signal, the value of the multiple bits at each address being an indication of the relative phase difference between each of the received data bits of the digital bit stream and the local oscillator, means for averaging the multiple bits representing the control signal amplitude over many bits of the received digital bit stream, and means for from time to time changing the frequency of the local oscillator from a nominal value to a value determined by the averaging means and for immediately thereafter returning the frequency of the local oscillator to the nominal value, the frequency of the local oscillator controlling the times when the received bit is sampled.

26. Apparatus for synchronizing an output of a local oscillator to received data bits of a digital data bit stream comprising means for sampling the binary value of each of the received data bits several predetermined times during each of the received data bits to derive for each received data bit a several bit binary word representing the sampled values, an addressable memory addressed in response to the several bit binary word for deriving a control signal having a value determined by the values of the several bits of the several bit binary word, means responsive to the value of the control signal for controlling the local oscillator synchronization, the synchronized local oscillator being connected to the means for sampling to control the occurrence times of the plural samples of each of the received bits so that the binary bits of the several bit binary word control the oscillator synchronization and the sampling occurrence times, the means for controlling including means for averaging the multiple bits representing the control signal amplitude over many bits of the received digital bit stream, and means for from time to time changing the frequency of the local oscillator from a nominal value to a value determined by the averaging means and for immediately thereafter returning the frequency of the local oscillator to the nominal value.

27. A memory for deriving a control signal for an oscillator of a receiver, the control signal having a spread of values over a prolonged period of receiver operation, the memory also deriving a signal used to derive a measure of the spread of values of corrections to be applied to the oscillator, the memory comprising an address input and many addresses where bits are stored, each address of the memory including plural first bits having values indicative of a correction to be applied to the oscillator and plural second bits indicative of the absolute value of the correction indicated by the first bits relative to a nominal non-zero correction value.

28. The memory of claim 27 wherein the values of the first bits are determined by the position and number of transitions in the binary value of the address.

* * * * *